United States Patent
Chang

[11] 3,927,475
[45] Dec. 23, 1975

[54] SAW GUIDE
[76] Inventor: Kenneth Chang, 47-425-A Mahakea Road, Kaneohe, Hawaii 96744
[22] Filed: Jan. 2, 1975
[21] Appl. No.: 538,022

[52] U.S. Cl. .................................. 33/42; 30/373
[51] Int. Cl.² .................................. B43I 13/02
[58] Field of Search ............. 33/42, 44, 32 B, 32 C, 33/103, 108, 41; 30/373, 293, 292

[56] References Cited
UNITED STATES PATENTS
1,594,482   8/1926   Wentz et al. ........................ 33/44
2,519,526   8/1950   Wilber ............................... 30/373
2,529,210   11/1950  Butler ............................... 33/32 B Primary Examiner—Harry N. Haroian

[57] ABSTRACT

An extensible guide, applicable to powered hand saws having base plates of various size, is adjustable to guide a saw at variable distances, and, in particular, relatively great distances from a straight edge, thereby providing a straight cut through a wide panel.

5 Claims, 5 Drawing Figures

SAW GUIDE

FIELD OF INVENTION

Cutlery, Saws with work-engaging members, Slidable guide-plate parallel to saw blade.

OBJECTS

Recurrent problems in straight-cutting a large sheet of material, for example, a "4 × 8 feet" panel, with a powered hand saw are encountered when the required cut is spaced a substantial distance from the panel edge. The guides with which the saws are usually furnished are not sufficiently extensible to provide straight cutting near the center of such a panel. Usually, the craftsman resorts to auxiliary straight-edges clamped onto the panel, or a free-hand cut, neither of which is truly satisfactory.

Another problem in connection with sawing a sizable panel along a line spaced a substantial distance from a straight-edge is the maintenance of the saw in absolute parallelism with the straight edge. Usually, the farther the cut is from the straight edge, the more the saw tends to deviate.

Still another problem is connection with powered hand saw gauges is in providing one that will work with most such saws on the market. Not only do these saws vary in type, e.g., circular or jig, but their base plates are of different size and shape.

The object now is to provide a powered hand saw guide which solves the foregoing problems in a simple and expeditious manner. More particularly, it is intended now to provide a guide having an elongate straight-edge engaging gauge plate, a fixed arm extending at right angles to that gauge plate and connectable to one end of a saw base plate, and another arm pivoted to the gauge plate and connectable to the other end of the saw base plate. Essentially, the first arm forms the base of a right triangle, the second arm forms the hypotenuse, and the saw base is the altitude. The above right triangle is variable in that the arms are adjustably connected to the saw base plate, and the saw base plates may vary in length. However, once both of the arms are clamped or otherwise secured to the saw base plate, this triangle becomes rigid. A second and always rigid right triangle is formed by a brace which connects the gauge plate to an intermediate portion of the first arm. Here, a portion of the first arm is the base of a right triangle, the gauge plate is the altitude and the brace is the hypotenuse. With this construction, the saw can be made to cut a straight line through a central portion of a wide panel, it can be readily adjustable at varying distances from the panel edge, and, once clamped in position by both clamp screws, the saw will not waiver.

These and other objects will be apparent from the following specification and drawings, in which.

Figure 1:
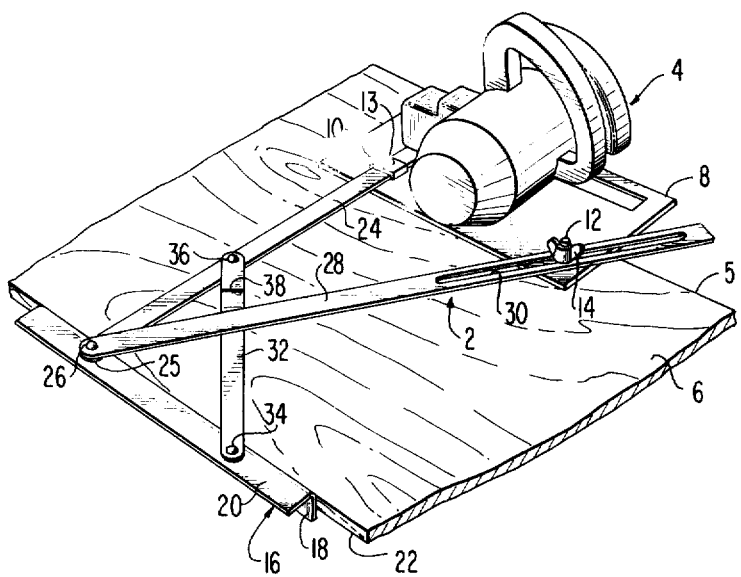
FIG. 1 is a perspective view of the saw guide in typical use.

Referring now to the drawing, in which like reference numerals denote similar elements, the saw guide 2 is shown, in FIG. 1, in typical usage wherein it is attached to a powered rotary hand saw 4 for making a straight cut 5 in an intermediate portion of a panel 6 at a considerable distance from one side 22 of the panel. The particular type of cutting tool, whether it be a powered rotary hand saw as illustrated, a saber saw, or whatever, is not significant except in that the tool, whatever it be, has a base plate 8 with means for attachment thereon to a cutting guide. In this example, the base plate 8 has two slide guides 10 spaced along its forward side and a clamp screw 12 having a wing nut 14 adjacent a rearward corner. In the present example, the openings through slide guides 10 are shallow rectangles, but it should be understood that they may be of other shape, such as with round or half-round.

Saw guide 2 is comprised of a gauge member 16, which is essentially an angle having a vertical flange 18 and a flat base 20. Vertical flange 18 engages against the straight edge 22 of panel 6, of course, and slides therealong. Extending at right angles from gauge member 16 is an arm 24 whose inner end 25 is connected as by a rivet 26 to the flat base 20 of gauge member 16. The outer or free end of arm 24 engages through slide guides 10 on the saw base plate 8. A second arm 28 extends diagonally from gauge member 16. The inner end of diagonal arm 28 is also connected as by the rivet 26 to which the inner end of arm 24 is connected. Rivet 26 forms a pivot for the inner end of arm 28. Along the outer or free end portion of diagonal arm 28 runs a slot 30, which slides over clamp screw 12. The wing nut 14, when tightened, clamps the diagonal arm 28 tightly against saw base 8. A diagonal brace 32 riveted as at 34 to the base 20 of gauge member 16 at a point remote from rivet 26 and to an intermediate portion of arm 24 holds the latter at all times in right angular relation to the length of gauge member 16. An offset 38 in brace 32 prevents the latter from interferring with free swinging of diagonal arm 28 freely about rivet pivot 26.

Figure 2:
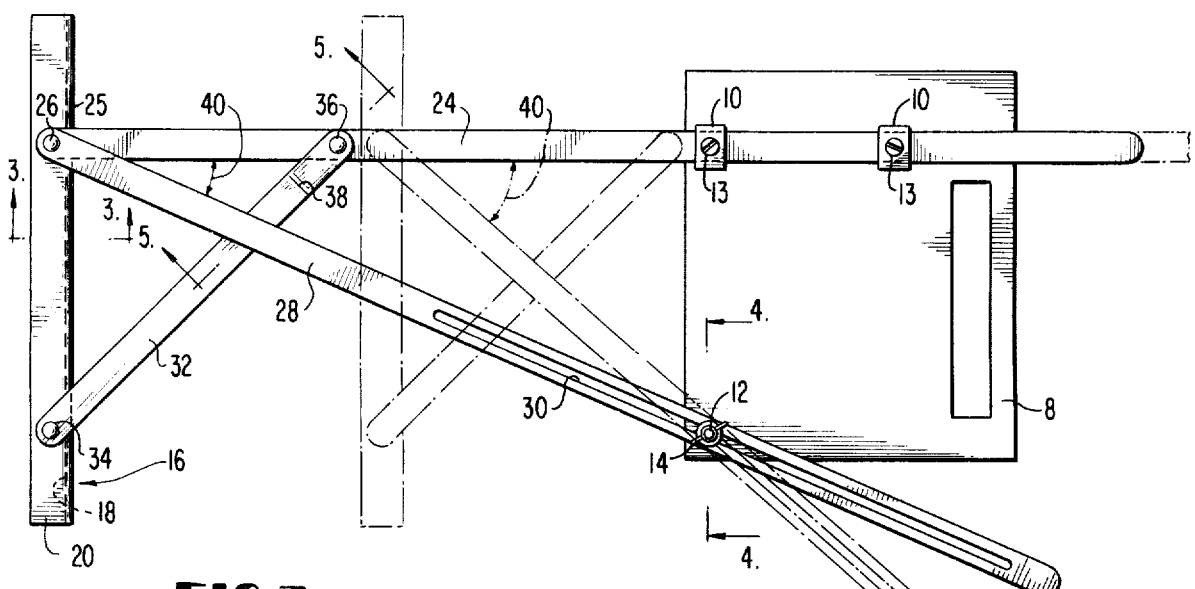
FIG. 2 is a plan view of the saw guide diagrammatically showing the saw base plate with the saw removed therefrom for purposes of simplification.
Figure 3:
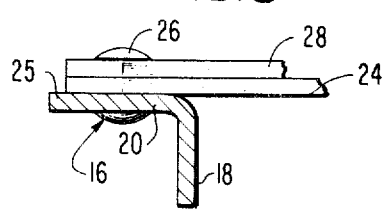
FIG. 3 is a fragmentary cross-section along the line 3—3 of FIG. 2.
Figure 4:
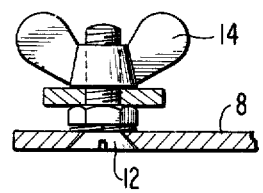
FIG. 4 is a fragmentary cross-section along the line 4—4 of FIG. 2.
Figure 5:
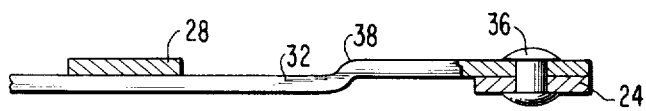
FIG. 5 is a fragmentary cross-section along the line 5—3 of FIG. 2.

In operation, the free end portion of arm 24 is engaged through guides 10 on the forward portion of saw plate 8 and slot 30 of diagonal arm 28 is engaged over clamp screw 12. The saw 4 is then adjusted to the desired distance away from gauge member 16 and clamp screws 12,13 are tightened down, thereby locking the saw 4 in the position desired to make cut 5. As will be apparent from FIG. 2, as saw 4 is adjusted towards or away from gauge member 16. The interior angle 40 between arm 24 which forms the base of a right triangle and diagonal arm 28 which forms the hypotenuse of the same right triangle will vary according to the distance adjustment or, geometrically speaking, according to the lengths of the base and hypotenuse of the right triangle. However, the smaller right triange., of which brace 32 constitutes the hypotenuse, the inner end portion 24 at the base and part of gauge member 16, is rigid and, hence, arm 24 at all times is maintained at right angles to the length of gauge plate 20.

When the saw guide 2 is applied to a saw wherein the distance between the guides 10 and clamp screw 12 is greater or lesser than on base plate 8, diagonal arm 28 is pivoted about rivet pivot 26 a corresponding amount to accommodate to whatever is the altitude of the right triangle formed by arm 24 and diagonal arm 28.

It should be understood further that the specific lengths, widths and thicknesses or the arm and brace may vary, the cross sectional shape of arm 24 may be varied or a different arm 24 substituted to correspond to the shape of the openings in the guides 10, and connections other than rivets may be used to connect the pieces together. In all cases, once the distance of the saw from gauge member 16 is adjusted, the depending flange of the latter slides along the straight edge, such as edge 22 of panel 6 while the saw moves along the cut.

I claim:

1. A guide for a saw, wherein the saw has a base plate,
   means on one end of the base plate forming a guideway running traversely to the fore-and-aft direction of the base plate, and a clamp member spaced from the guideway towards the other end thereof, said guide comprising, an elongate gauge member adapted to engage and slide along a straight edge associated with work to be sawed,
   a first arm having an inner end joined to the gauge member and an outer end portion engageable at a selected location along the length thereof in the guideway on the saw base plate,
   means for maintaining the first arm at right angles to the length of the gauge member, and a second arm,
   pivot means connected an inner end of the second arm to the gauge member at the juncture of the inner end of the first arm with said gauge member,
   the second arm having an outer end portion engageable at a selected point therealong by the clamp means on the saw base plate, whereby said arms and said base plate form a rigid right triangle when the other end portion of said second arm is clamped to said base plate.

2. A guide as claimed in claim 1, the means for maintaining the first arm at right angles to the gauge member comprising a brace having one end connected to the gauge member at a point thereon remote from the juncture of the first arm with the gauge member and having another end connected to the first arm at a point thereon remote from said juncture, said brace, a portion of said gauge member and a portion of said first arm forming a second rigid right triangle.

3. A guide as claimed in claim 1, said gauge member comprising an angle strip having a depending flange adapted for sliding movement along a straight edge.

4. A guide for a tool comprising,
   an elongate gauge member adapted to slidingly engage a straight edge,
   a first arm having an inner end portion jointed to the gauge member and extending outwardly therefrom,
   means for maintaining the first arm at right angles to the length of the gauge member, a second arm having an inner end portion pivoted to the gauge member at the juncture of the first arm with the gauge member and being swingable with respect thereto,
   said arms having outer end portions adapted to be engaged by elements respectively disposed on spaced portions of a tool.

5. A guide as claimed in claim 4, said second arm having a lengthwise slot in the outer end portion thereof for accommodating a clamp screw on the tool.

* * * * *